United States Defensive Publication [19] (H) [11] T965,003

Schellekens et al. [43] Dec. 6, 1977

[54] PROCESS FOR COATING A PIPE

[75] Inventors: Joannes C. A. Schellekens; Eric J. Van Beem, both of Amsterdam, Netherlands

[73] Assignee: Shell Oil Company

[21] Appl. No.: 770,500

[22] Filed: Feb. 22, 1977

[30] Foreign Application Priority Data

Mar. 5, 1976 United Kingdom ..... 8907/76

[51] Int. Cl.[2] ..... B05D 1/36; B05D 7/14; B32B 1/08

[52] U.S. Cl. ..... 427/409; 260/28.5 AS; 428/36

[57] ABSTRACT

A process for coating a pipe, tube, or conduit is disclosed, which process consists of applying to the article a bituminous composition comprising:

a. from 80 to 99 parts by weight of a bituminous component;
b. from 1 to 20 parts by weight of a block copolymer having the general structure A—B—B—A)$_n$ where A is thermoplastic polymer block of a monoalkenyl arene, B is an elastomeric polymer block of a conjugated diene, and n is an integer from 1–15;
c. from 1 to 60 percent by weight of a wax; and
d. from 1 to 100 percent by weight of an inorganic filler wherein the percentages of wax and filler are based on the combined weight of the bituminous component and the block copolymer.

8 Claims, No Sheets Drawing,

11 Pages Specification

The file of this unexamined application may be inspected and copies thereof may be purchased (849 O.G. 1221, Apr. 9, 1968).